US012693922B2

(12) United States Patent
Grover et al.

(10) Patent No.: US 12,693,922 B2
(45) Date of Patent: Jul. 28, 2026

(54) TRACKING VIRTUAL PROCESSES TO IDENTIFY ANOMALIES

(71) Applicant: MICRO FOCUS LLC, Wilmington, DE (US)

(72) Inventors: Douglas Max Grover, Rigby, ID (US); Michael F Angelo, Houston, TX (US)

(73) Assignee: Micro Focus LLC, Wilmington, DE (US)

( * ) Notice: Subject to any disclaimer, the term of this patent is extended or adjusted under 35 U.S.C. 154(b) by 55 days.

(21) Appl. No.: 18/505,366

(22) Filed: Nov. 9, 2023

(65) Prior Publication Data

US 2025/0156254 A1     May 15, 2025

(51) Int. Cl.
*G06F 11/07* (2006.01)
*G06F 11/30* (2006.01)
(52) U.S. Cl.
CPC ........ *G06F 11/0712* (2013.01); *G06F 11/301* (2013.01)
(58) Field of Classification Search
CPC ... G06F 11/0712; G06F 11/301; H04L 63/145
USPC ......................................................... 726/23
See application file for complete search history.

(56) References Cited

U.S. PATENT DOCUMENTS

| | | | | |
|---|---|---|---|---|
| 8,806,639 | B2 * | 8/2014 | Mohler | .................. G06F 21/53 |
| | | | | 709/215 |
| 10,824,726 | B1 | 11/2020 | Herman Saffar | |
| 10,936,717 | B1 | 3/2021 | Herman Saffar | |
| 2016/0147585 | A1 * | 5/2016 | Konig | ................. G06F 11/0751 |
| | | | | 714/37 |
| 2016/0359877 | A1 * | 12/2016 | Kulshreshtha | ...... H04L 63/0876 |
| 2017/0206353 | A1 * | 7/2017 | Jai | .......................... G06F 21/565 |
| 2024/0086525 | A1 * | 3/2024 | Orazio | .................. G06F 21/554 |
| 2024/0214348 | A1 * | 6/2024 | Benameur | ........... H04L 63/1425 |
| 2024/0220619 | A1 * | 7/2024 | Divakaran | ............ G06F 21/565 |
| 2024/0354411 | A1 * | 10/2024 | Wang | .................... G06F 21/566 |

FOREIGN PATENT DOCUMENTS

CN          109586999 B          3/2021

* cited by examiner

*Primary Examiner* — Meng Vang
(74) *Attorney, Agent, or Firm* — Sheridan Ross P.C.

(57) ABSTRACT

A virtualization pattern is learned. The learned virtualization pattern comprises information associated with one or more virtualized processes. For example, the virtualization pattern may comprise the creation of a first micro service and the spawning of a second micro service from the first micro service. The learned virtualization pattern is compared to a current virtualization pattern to identify an anomalous virtualization pattern in the current virtualization pattern. In response to identifying the anomalous virtualization pattern in the current virtualization pattern, an action is taken. For example, the action taken may be to quarantine a virtual process, to unload the virtual process, to quarantine a tenant partition, and/or the like.

20 Claims, 10 Drawing Sheets

TRACKING VIRTUAL PROCESSES TO IDENTIFY ANOMALIES

FIELD

The disclosure relates generally to anomaly detection in computer networks and particularly to anomaly detection in computer networks by tracking virtual processes.

BACKGROUND

Tracking anomalous behavior is often difficult and hard to detect. This problem is exacerbated even further in a cloud environment where there are multiple tenants who use a combination of tenant services and cloud services. Whether the breach is for a single tenant or for all the tenants in the cloud service, when all or some of the cloud is breached, the end results are not acceptable.

SUMMARY

These and other needs are addressed by the various embodiments and configurations of the present disclosure. The present disclosure can provide a number of advantages depending on the particular configuration. These and other advantages will be apparent from the disclosure contained herein.

A virtualization pattern is learned. The learned virtualization pattern comprises information associated with one or more virtualized processes. For example, the virtualization pattern may comprise the creation of a first micro service and the spawning of a second micro service from the first micro service. The learned virtualization pattern is compared to a current virtualization pattern to identify an anomalous virtualization pattern in the current virtualization pattern. In response to identifying the anomalous virtualization pattern in the current virtualization pattern, an action is taken. For example, the action taken may be to quarantine a virtual process, to unload the virtual process, to quarantine a tenant partition, and/or the like.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

As defined herein and in the claims, the term "virtual process" can be or may include a micro service, a virtual machine, a container, and/or the like.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
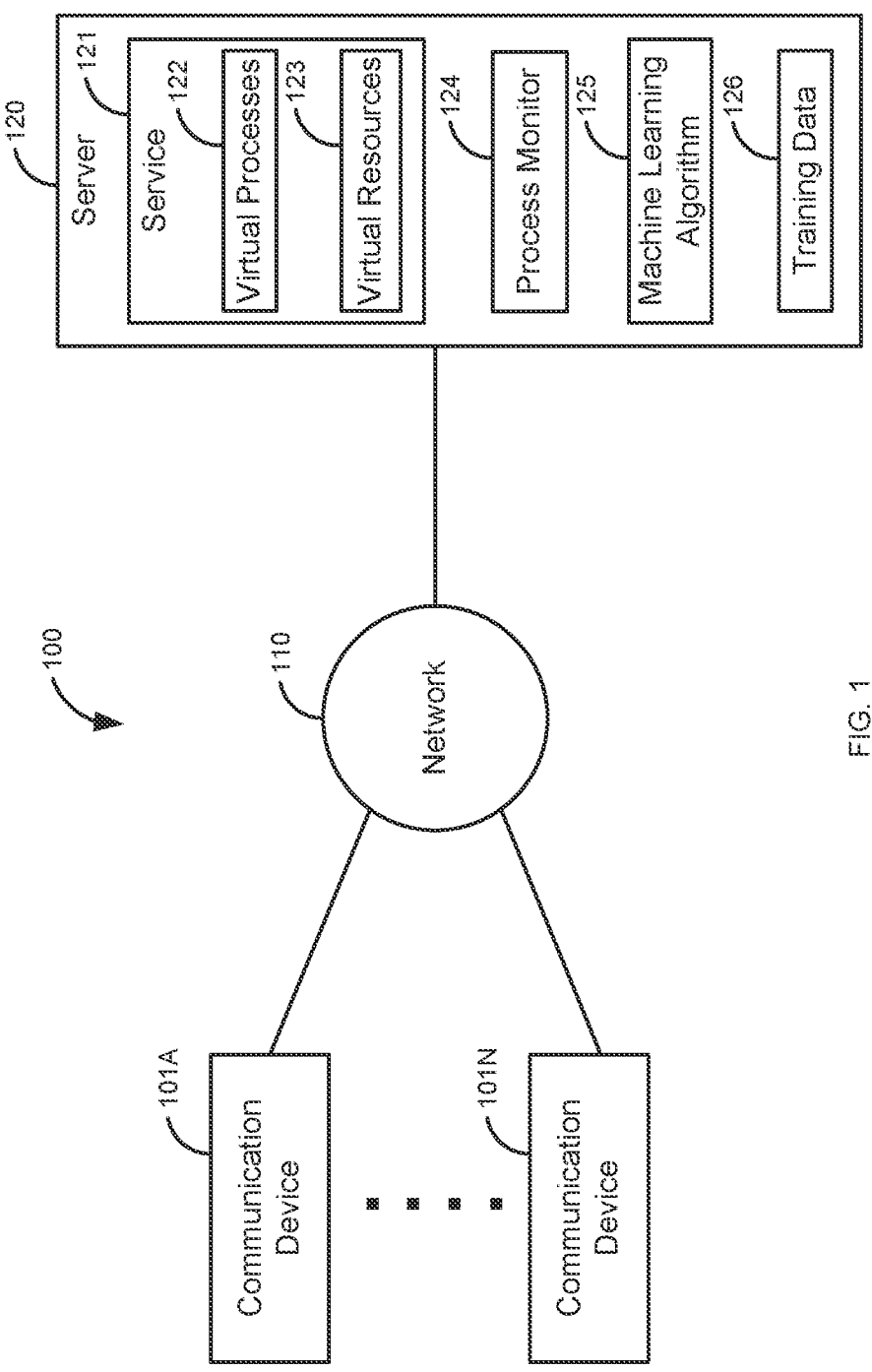
FIG. 1 is a block diagram of a first illustrative system for tracking virtual processes to identify an anomalous virtualization pattern.

FIG. 1 is a block diagram of a first illustrative system 100 for tracking virtual processes 122 to identify an anomalous virtualization pattern. The first illustrative system 100 comprises communication devices 101A-101N, a network 110, and a server 120.

The communication devices 101A-101N can be or may include any user device that can communicate on the network 110, such as a Personal Computer (PC), a telephone, a video system, a cellular telephone, a Personal Digital Assistant (PDA), a tablet device, a notebook device, a smartphone, a laptop computer, and/or the like. As shown in FIG. 1, any number of communication devices 101A-101N may be connected to the network 110, including only a single communication device 101. The communication devices 101A-101N are used by the users to access the service 121.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Markup Language (HTML), Hyper Text Transfer Protocol (HTTP), Web Real-Time Protocol (Web RTC), and/or the like. Thus, the network 110 is an electronic communication network configured to carry messages via packets and/or circuit switched communications.

The server 120 can be or may include any device that can provide the service 121 to the communication devices 101A-101N, such as, an application server, a web server, a social media server, a database server, and/or the like. The server 120 comprises the service 121, a process monitor 124, a machine learning algorithm 125, and training data 126.

The service 121 may be any service/application that uses the virtual processes 122. The service 121 may be a software application, a network application, a web application, a security application, a database application, and/or the like. The service comprises virtual processes 122 and virtual resources 123.

The virtual processes 122 can be or may include any type of virtual process 122, such as a micro service, a container, a virtual machine, and/or the like. The virtual processes 122 can be a series of virtual processes 122 that get created/used/deleted as part of running the service 121. The virtual processes 122 may be combinations of different types of virtual processes 122.

The virtual resources 123 can be or may include any type of resource used by the virtual processes 122, such as processors, processor cores, memory, disk space, network resources (e.g., a network card, network storage, etc.), thread resources, database resources, embedded devices (e.g., a printer, a copier, a FAX machine etc.), and/or the like. The virtual resources 123 are used by the virtual processes 122 as needed.

The process monitor 124 monitors the virtual processes 122 and/or the virtual resources 123 to identify anomalous virtualization patterns in the virtual processes 122/virtual resources 123. The process monitor 124 uses the machine learning algorithm 125 to identify the anomalous virtualization patterns of the virtual processes 122/virtual resources 123.

The machine learning algorithm 125 can be any type of machine learning algorithm 125 that can be used to identify anomalous virtualization patterns, such as supervised machine learning, semi-supervised machine learning, unsupervised machine learning, reinforcement machine learning, and/or the like. The machine learning algorithm 125 may use the training data 126 as input to train the machine learning algorithm 125 to identify the anomalous virtualization patterns.

The training data 126 is historical data of the virtual processes 122/virtual resources 123 used by and within the service 121. The training data 126 is captured data of how the virtual processes 122/virtual resources 123 are created, used, deleted cloned, and/or the like over time. This can include time periods, times of day, weekly information, and/or the like. The training data 126 is data where the service 121 is operating under normal conditions.

Figure 2:
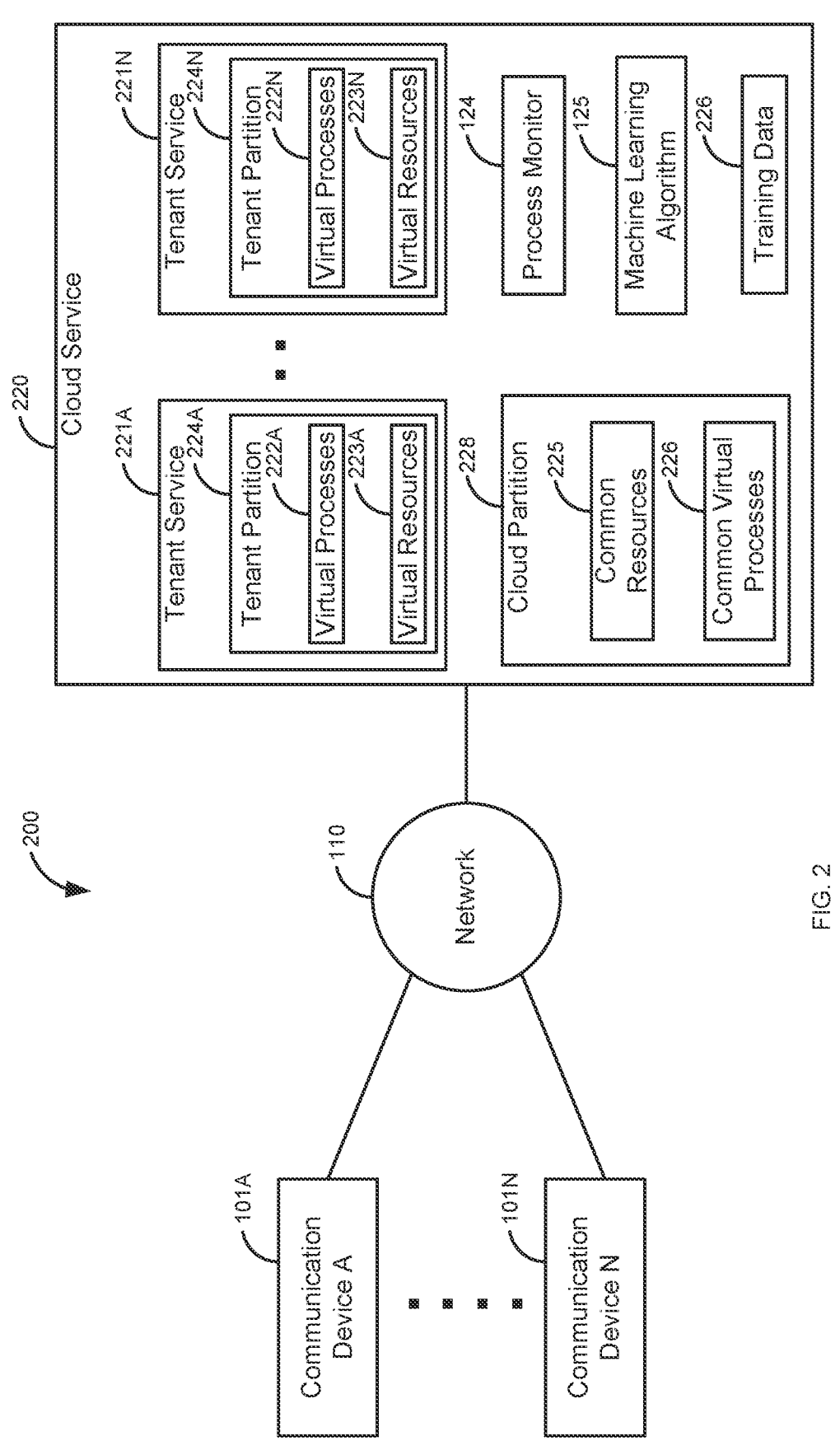
FIG. 2 is a block diagram of a second illustrative system for tracking virtual processes to identify an anomalous virtualization pattern.

FIG. 2 is a block diagram of a second illustrative system 200 for tracking virtual processes 222 to identify an anomalous virtualization pattern. The second illustrative system 200 comprises the communication devices 101A-101N, the network 110, and a cloud service 220. In FIG. 2, the communication devices 101A-101N are used to access the cloud service 220 for individual tenants of the cloud service 220. A tenant may be a user, a group, a corporation, an entity, and/or the like.

The cloud service 220 may be any type of cloud service 220, such as web service, an application service, and networking service, a security service, a database service, a financial service, a shopping service, a corporate application, and/or the like. The cloud service 220 may provide the same and/or different types of tenant services 221A-221N. For example, the cloud service 220 may provide a security tenant service 221 for a first tenant and a database tenant service 221 for a second tenant. The cloud service 220 may be provided by a third-party for each of the individual tenants. The cloud service 220 comprises tenant services 221A-221N, a cloud partition 228, the process monitor 124, the machine learning algorithm 125, and the training data 126.

The tenant services 221A-221N are individual services 121 that are provided to the tenants. The tenant services 221A-221N can be or may include any type of service, such as software application, a network application, a web application, a security application, a database application, and/or the like. The tenant services 221A-221N comprise tenant partitions 224A-224N.

The tenant partitions 224A-224N are partitions of the cloud service 220 where the virtual processes 222A-222N/virtual resources 223A-223N/tenant information resides for each individual tenant. The tenant partitions 224A-224N are isolated from each other and the cloud partition 228.

The cloud partition is a partition where services that are common to the tenant services are managed. The cloud partition 228 is a separate from the tenant partitions 224A-224N. The cloud partition 228 comprises common resources 225 and common virtual processes 226.

The common resources 225 are one or more common resources 225 that are shared between the tenant partitions. For example, the common resources 225 may be a common database, a common disk space, a common network resource (e.g., a printer or network card), and/or the like.

The common virtual processes 225 can be any common virtual process 225 that is shared between the tenant services 221A-221N, such as a common authentication micro service, a common database micro service, a common security container, a common network access micro service, a common virtual machine, a common verification service, and/or the like. The common virtual processes 225 may be shared by all the tenant services 221A-221N or by only a portion of the tenant services 221A-221N.

In the cloud service 220, the process monitor 124 and the machine learning algorithm 125 may be similar to the process monitor 124 and the model machine learning algorithm 125 of FIG. 1. In one embodiment, the process monitor 124/machine learning algorithm 125 may be different. For example, a different machine learning algorithm 125 may be used in the cloud service 220.

The training data 226 is training data for the virtual processes 222A-222N/virtual resources 223A-223N of the tenant services 221A-221N. The training data 226 is training data that is captured over time during normal usage of the tenant services 221A-221N.

The cloud service 220 typically has multiple tenants. Each of the tenant services 221A-221N may have the same or have different virtual processes 222. A virtual process 222 may be a container, a micro service, a virtual machine, and/or the like. The tenant services 221A-221N may use the same or different virtual resources 223. The virtual resources 223 may include things like processors, processor cores, memory, threads, network cards, and/or the like.

Figure 3:
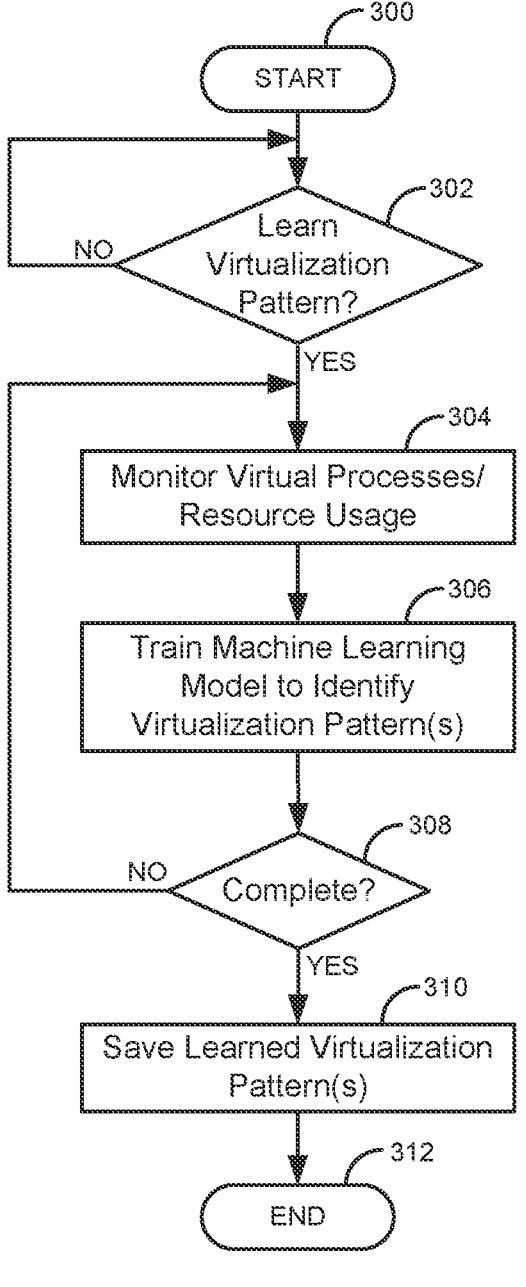
FIG. 3 is a flow diagram of a process for training a machine learning algorithm to identify anomalous virtualization patterns.

FIG. 3 is a flow diagram of a process for training a machine learning algorithm 125 to identify anomalous virtualization patterns. Illustratively, the communication devices 101A-101N, the server 120, the service 121, the virtual processes 122, the virtual resources 123, the cloud service 220, the tenant services 221A-221N, the tenant partitions 224A-224N, the process monitor 124, the machine learning algorithm 125, the training data 126, the virtual processes 222A-222N, the virtual resources 223A-223N, the cloud partition 228, the common resources 225, and the common virtual processes 226 are stored-program-controlled entities, such as a computer or microprocessor, which performs the methods of FIGS. 3-10 and the processes described herein by executing program instructions stored in a computer readable storage medium, such as a memory (i.e., a computer memory, a hard disk, and/or the like). Although the methods described in FIGS. 3-10 are shown in a specific order, one of skill in the art would recognize that the steps in FIGS. 3-10 may be implemented in different orders and/or be implemented in a multi-threaded environment. Moreover, various steps may be omitted or added based on implementation.

The process of FIG. 3 may work with either of the systems 100/200 described in FIGS. 1-2. The process starts in step 300. The process monitor 124 determines, in step 302, if a virtualization pattern is to be learned. If a virtualization pattern is not to be learned in step 302, the process of step 302 repeats.

Otherwise, if a virtualization pattern is to be learned in step 302, the process monitor 124 monitors, in step 304, the virtual processes 122/222/virtual resources 123/223 to determine the normal virtualization patterns over time. This may include the virtual resources 123/223 in relation to the virtualization patterns of the virtual processes 122/222.

The process monitor 124 trains, in step 306, the machine learning algorithm 125 to identify the normal virtualization pattern(s). Step 306 may identify multiple virtualization patterns. For example, if there are multiple tenants in the cloud service 220, there may be individual learned virtualization patterns identified for each tenant. If there is a single service 121 used by a single entity, there may be only a single learned virtualization pattern. Alternatively, there may be multiple learned virtualization patterns for a single service 121. For example, there may be different virtualization patterns based on different time periods.

The process monitor 124 determines, in step 308, if the process is complete. If the process is not complete in step 308, the process goes back to step 304 to continue to learn the virtualization pattern(s). Otherwise, if the process is complete in step 308, the learned virtualization patterns are saved in step 310 and the process ends in step 312. In one embodiment, the saving of the learned virtualization patterns may be accomplished between steps 306 and 308 or between steps 304 and 306.

Figure 4:
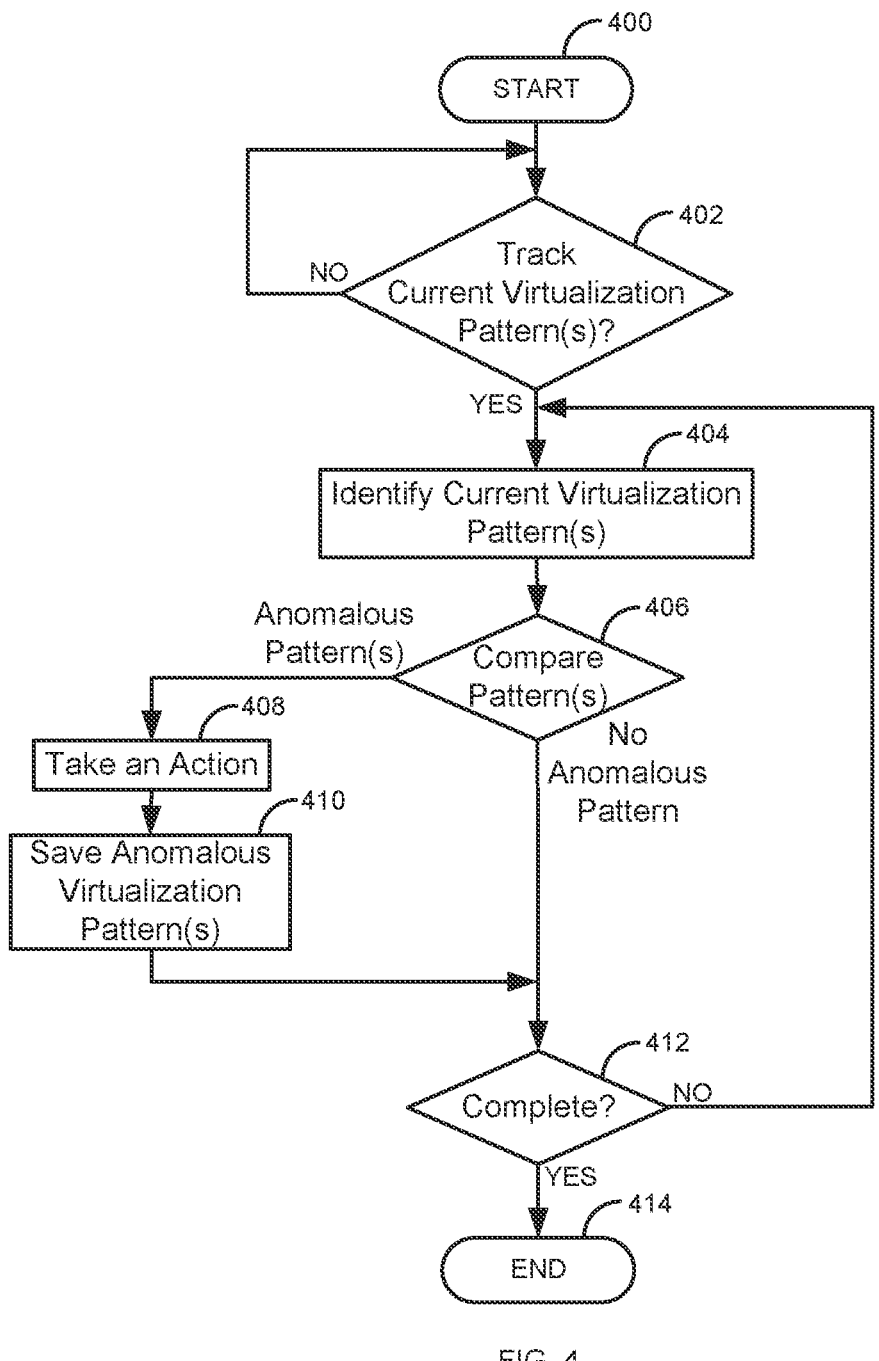
FIG. 4 is a flow diagram of a process for tracking virtual processes to identify an anomalous virtualization pattern.

FIG. 4 is a flow diagram of a process for tracking virtual processes 122/222 to identify an anomalous virtualization pattern. The process starts in step 400. The process monitor 124 determines, in step 402, whether to track the current virtualization pattern(s). If the process monitor 124 is to not track the current virtualization pattern(s) in step 402, the process of step 402 repeats.

Otherwise, if the process monitor 124 is to track the current virtualization patterns in step 402, the process monitor 124 identifies the current virtualization pattern(s) in step 404. The identification of the current virtualization pattern(s) may be a progressive learning of the flow of virtual resources are created, spawned, used, deleted, and/or the like. This may include other factors, such as detecting a usage spike of a virtual resource 123/223, a change in virtual resource size, opening a port, and/or the like. The process monitor 124/machine learning 125 compares the current virtualization pattern(s) to the saved virtualization pattern(s) (e.g., those saved off in step 310) in step 406. This may include comparing the current virtualization pattern to a portion of the saved virtualization pattern as current virtualization pattern is learned over time. If there are no anomalous virtualization pattern(s) in step 406, the process goes to step 412. The comparison of step 406 may use a threshold that allows for different levels of variation.

If there is an anomalous virtualization pattern(s) in step 406, an action is taken in step 408. For example, the action may be to quarantine a virtual process 122/222, to unload the virtual process 122/222, to store a virtual process image, to change access privileges of the virtual process 122/222, to quarantine a tenant partition 224, to quarantine a common cloud virtual process 226, to log out a user, to block a port on a firewall, to block access to a common database, to block network access for the virtual process 122/222, and/or the like. The anomalous virtualization pattern(s) are then saved in step 410 and the process goes to step 412.

The process monitor 124 determines, in step 412, if the process is complete. If the process is not complete in step 412, the process goes to step 404 to continue to identify the current virtualization pattern. Otherwise, if the process is complete in step 412, the process ends in step 414.

Figure 5:
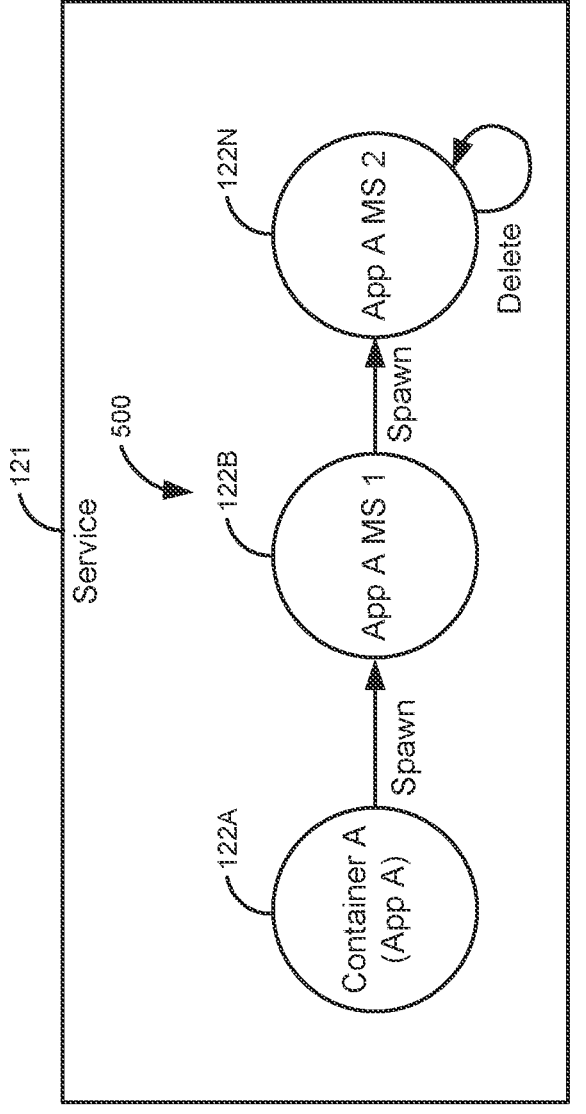
FIG. 5 is a diagram of a virtualization pattern for a service.

FIG. 5 is a diagram of a virtualization pattern 500 for a service 121. FIG. 5 is an example of a normal virtualization pattern 500 for the service 121. The virtualization pattern 500 comprises virtual processes 122A-122N. The virtual process 122A is a container that contains the application A. The virtual process 122A spawns the virtual process 122B. The virtual process 122B is a micro service 1 for the application A. The virtual process 122B then spawns the application A micro service 2 (virtual process 122N). The virtual process 122N then deletes itself. The virtualization pattern 500 comprises the creation/usage/deletion flow of the virtual services 122A-122N overtime. Although not shown, the virtualization pattern 500 may include some or all of the resources (e.g., memory, disk space, threads, etc.) used by each or some of the virtual processes 122A-122N.

Figure 6:
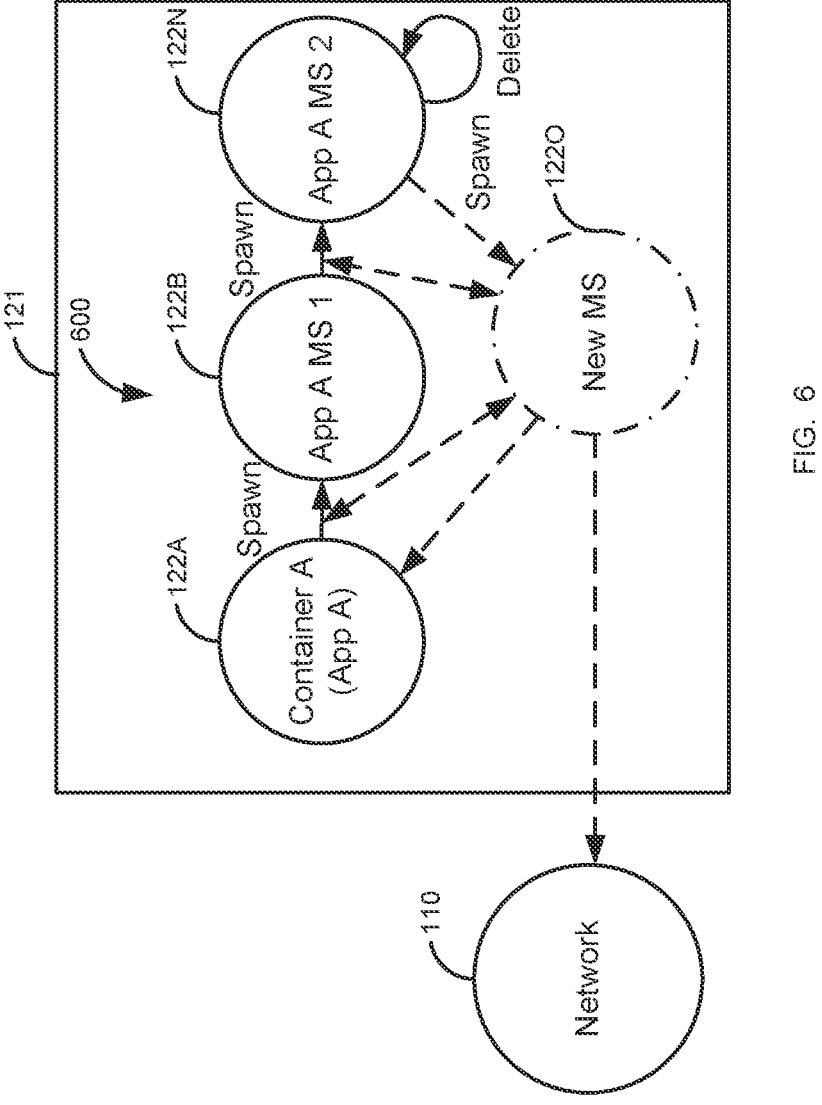
FIG. 6 is a diagram of an anomalous virtualization pattern for a service.

FIG. 6 is a diagram of an anomalous virtualization pattern 600 of a service 121. The anomalous virtualization pattern 600 comprises the same virtual processes 122A-122N as shown in FIG. 5. However, the difference between FIG. 5 and FIG. 6 is that the service 121 has been compromised and the virtual process 122N has spawned a new malicious virtual process 122O (a new malicious micro service). The malicious virtual process 122O is now monitoring the virtual process 122A and the flow of information between the virtual services 122A-122B and 122B-122N. The virtual process 122O has also created an external connection to the network 110N. Although not shown, the anomalous virtualization pattern 600 may include some or all of the resources (e.g., memory, disk space, threads, etc.) used by the virtual processes 122A-122N and 122O.

Figure 7:
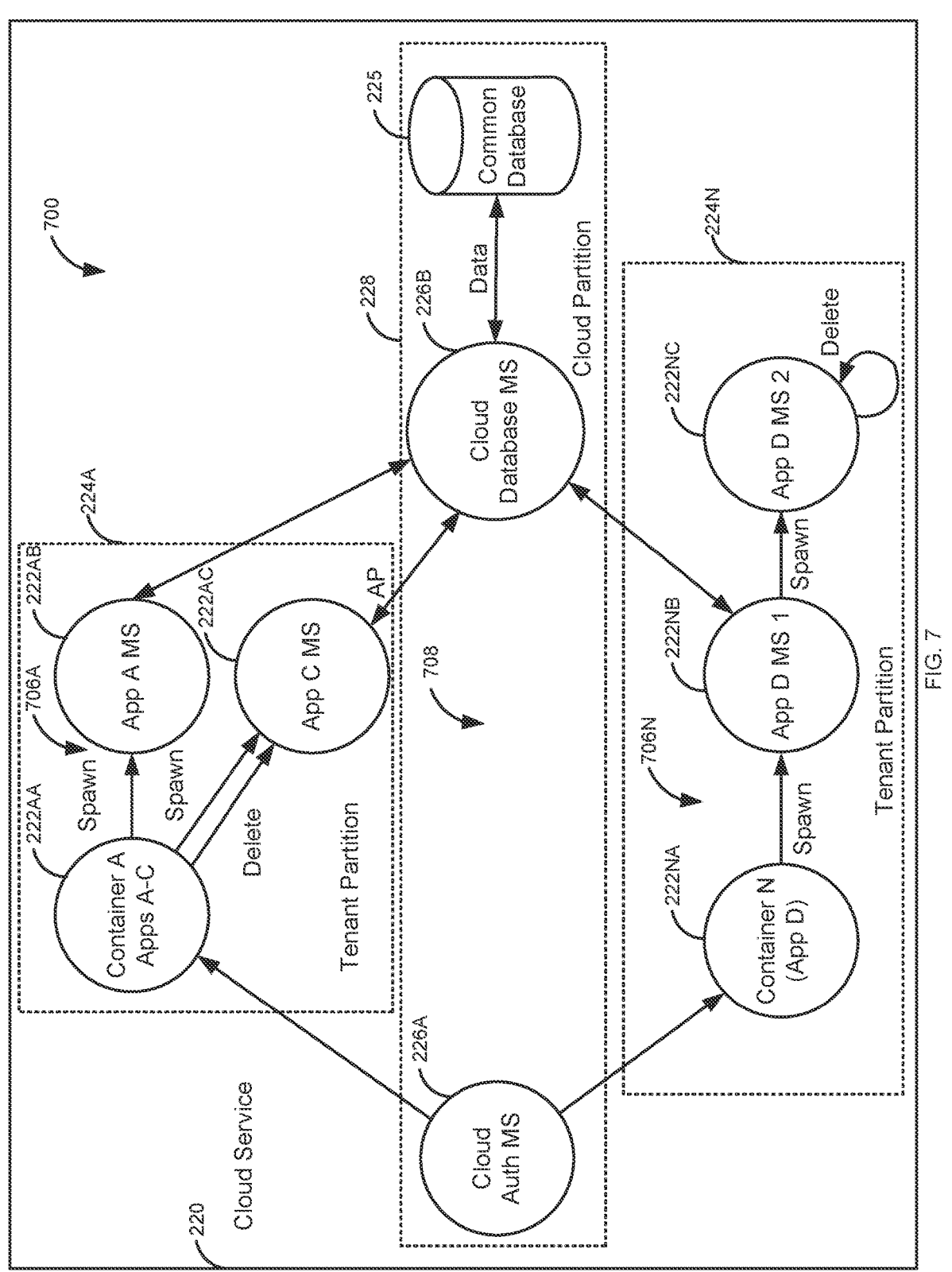
FIG. 7 is a diagram of a cloud service virtualization pattern of a cloud service.

FIG. 7 is a diagram of a cloud service virtualization pattern 700. The cloud service 220 comprises tenant partitions 224A-224N and the cloud partition 228. Within the tenant partitions 224A-224N are virtual processes 224 that comprise tenant virtualization patterns 706A-706N. Likewise, within the cloud partition 228 are common virtual processes 226 that comprise the cloud virtualization pattern 708. The cloud service virtualization pattern 700 comprises the tenant virtualization patterns 706A-706N and the cloud virtualization pattern 708.

The tenant virtualization pattern 706A comprises virtual processes 222AA-222AC. The tenant virtualization pattern 706A shows the flow of how the virtual processes 222AA-222AC are created/used/deleted over time. A user authenticates to the tenant partition 224A using the common virtual process 226A. This allows access to the tenant partition 224A. In addition, it allows access to the virtual process 222AA (container A that comprises applications A-C), which at this point has already been initialized/loaded. The application A spawns the virtual process 222AB (a micro service). The virtual process 222AB then accesses the common virtual process 226B (the cloud common database micro service) to access the common database 225 (a common resource 225). Likewise, the application C spawns the virtual process 222AC. The virtual process 222AC then access the common virtual process 226B (a common database micro service) to access the common database 225 (a common resource 225). After accessing the common database 225, the virtual process 222AA deletes the virtual process 222AC.

The tenant virtualization pattern 706N comprises virtual processes 222NA-222NC. The tenant virtualization pattern 706N shows the flow of how the virtual processes 222NA-222NC are created/used/deleted over time. A user authenticates to the tenant partition 224N using the common virtual process 226A. This allows access to the tenant partition 224N. In addition, it allows access to the virtual process 222NA (container N that comprises application D), which at this point has already been initialized/loaded. The application D then spawns the virtual process 222NB (a micro service), which in turn spawns the virtual process 222NC (a second micro service). The virtual process 222NB access the common virtual process 226B (the common database micro service) to access the common database 225 (a common resource 225). The virtual process 222NC then deletes itself.

Note in this example, the virtual services 222/applications in each of the tenant virtualization patterns 706A-706N comprise different virtual services 222/applications. However, in other embodiments, each of the tenant virtualization patterns 706 may be similar. Although not shown, the virtualization patterns 700, 706A-706N, and 708 may include resource usage. For example, resource usage may include things like memory, disk space, thread creation, network access/usage, access privileges (e.g., to the common database 225), and/or the like.

Figure 8:
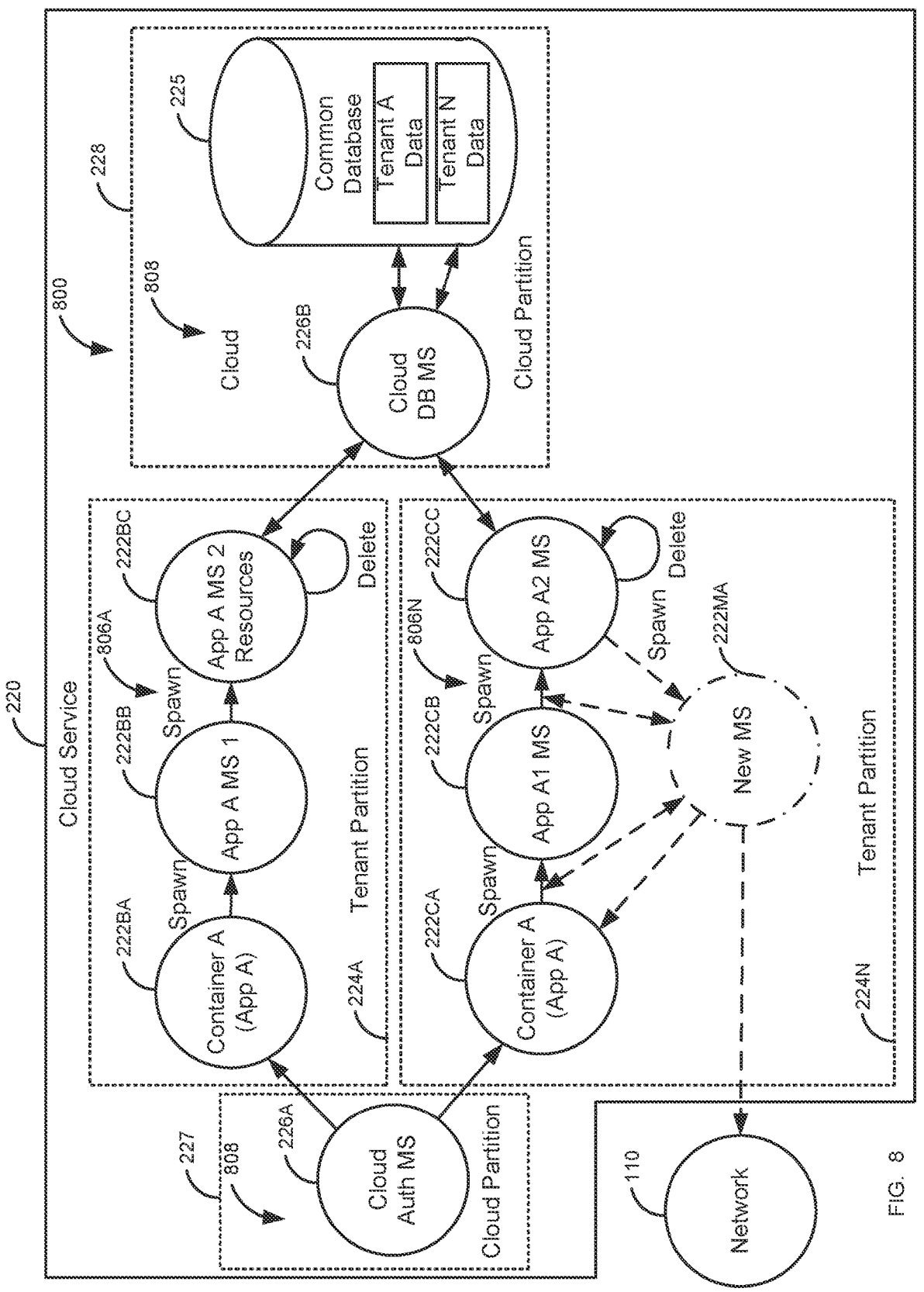
FIG. 8 is a diagram of a cloud service anomalous virtualization pattern in a tenant partition.

FIG. 8 is a diagram of a cloud service anomalous virtualization pattern 806 in a tenant partition 224N. In FIG. 8, the cloud service 220 comprises tenant partitions 224A-224N and the cloud partition 228. Within the tenant partitions 224A-224N are virtual processes 222 that comprise tenant virtualization patterns 806A-806N. Likewise, within the cloud partition 228 are common virtual processes 226 that comprise the cloud virtualization pattern 808. The cloud service virtualization pattern 800 comprises the tenant virtualization patterns 806A-806N and the cloud virtualization pattern 808.

The tenant virtualization pattern 806A comprises virtual processes 222BA-222BC. The tenant virtualization pattern 806A shows the flow of how the virtual processes 222BA-222BC are created/used/deleted. A user authenticates to the tenant partition 224A using the common virtual process 226A. This allows access to the tenant partition 224A. In addition, it allows access to the virtual process 222BA (container A that comprises application A), which at this point has already been initialized/loaded. The application A then spawns the virtual process 222BB (a micro service), which in turn spawns the virtual process 222BC (a second micro service). The virtual process 222BC accesses the common virtual process 226B (the common database micro service) to access the common database 225 (a common resource 225). The virtual process 222BC then deletes itself.

Similarly, the tenant virtualization pattern 806N comprises virtual processes 222CA-222CC. The tenant virtualization pattern 806N shows the flow of how the virtual processes 222CA-222CC are created/used/deleted over time. A user authenticates to the tenant partition 224N using the common virtual process 226A. This allows access to the tenant partition 224N. In addition, it allows access to the virtual process 222CA (container A that comprises application A), which at this point has already been initialized/ loaded. The application A then spawns the virtual process 222CB (a micro service), which in turn spawns the virtual process 222CC (a second micro service). The virtual process 222CC accesses the common virtual process 226B (the common database micro service) to access the common database 225 (a common resource 225). The virtual process 222CC then deletes itself.

However, in FIG. 8, the tenant virtualization pattern 806N has an anomalous portion of the tenant virtualization pattern 806N (represented by the dashed lines). The anomalous virtualization pattern 806N comprises a new malicious virtual process 222MA that was spawned from the virtual process 222CC. The virtual process 222MA (a new malicious micro service) is accessing/interacting with the virtual process 222CA. In addition, the virtual process 222MA service is also monitoring data/information passed between the virtual processes 222CA to 222CB and 222CB to 222CC. For example, the virtual process 222MA may monitor the virtual process 222CA by making function calls, by monitoring a connection between virtual processes 222, and/or the like. The new malicious virtual process 222MA has also made a connection out of the cloud service 220 via the tenant A's tenant partition 224N. In this example, only tenant A's tenant partition 224N has been breached.

Figure 9:
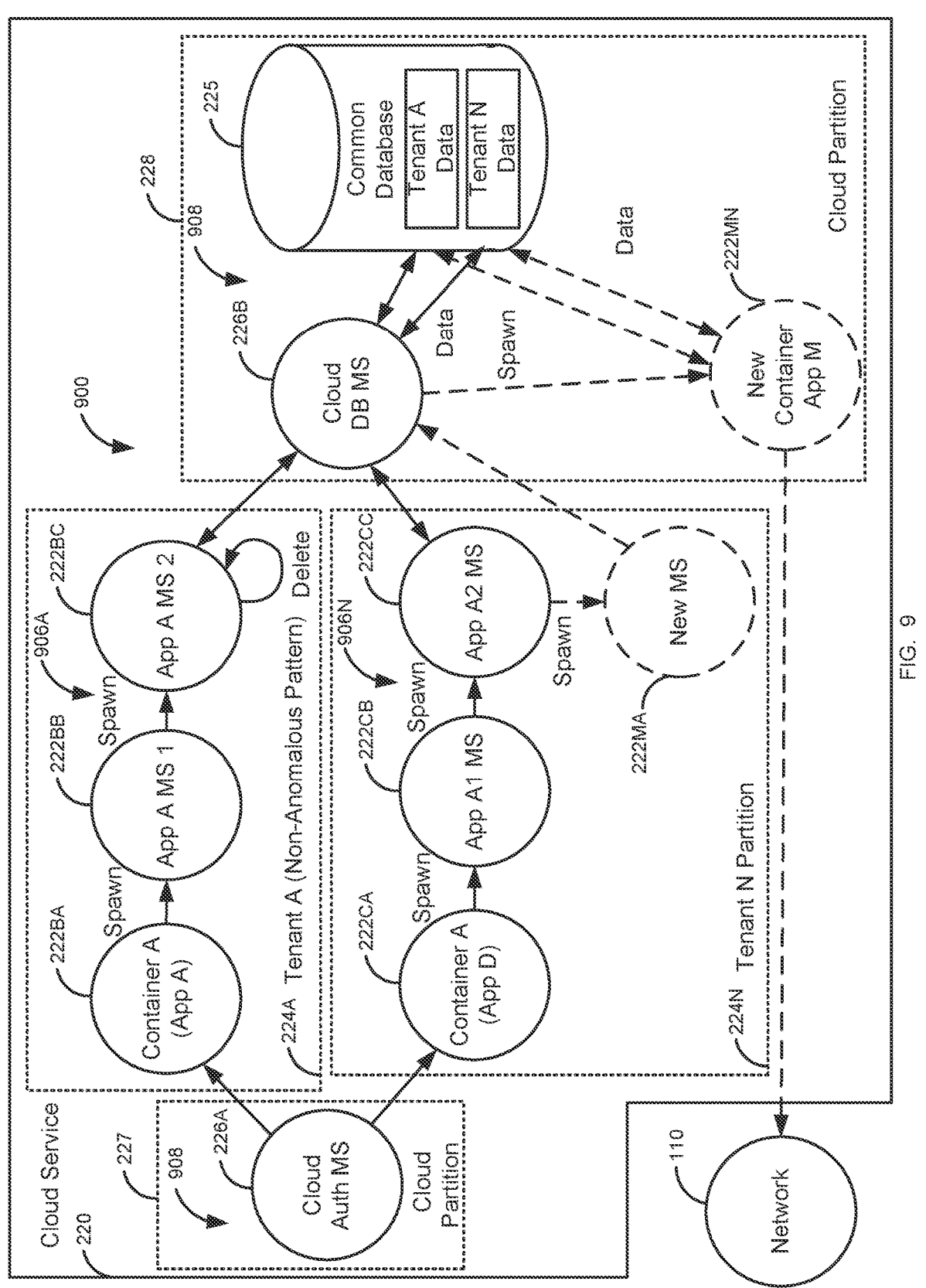
FIG. 9 is a diagram of an anomalous virtualization pattern that shows a progressive breach of a cloud service.

FIG. 9 is a diagram of an anomalous virtualization pattern 900 that shows a progressive breach of a cloud service 220. In FIG. 9, the normal virtualization patterns 906A-906N are the same as described in FIG. 8. However, after the malicious virtual process 222MA is spawned, the malicious virtual process 222MA then attacks the common virtual process 226B. This results in the spawning of the virtual process 222MN (a malicious container) which is an attack on the cloud partition 228/cloud virtualization pattern 908. The malicious virtual process 222MN then accesses data in the common database 225 for both of the tenants A and N. The malicious virtual process 222MN then sends the accessed data outside the cloud service 220 to the network 110. In this example, not only is the tenant partition 224N breached, but the cloud partition 228. In other words, there is also an anomalous cloud virtualization pattern 908.

By identifying the anomalous virtualization pattern 906N/ anomalous cloud virtualization pattern 908, it is easy to see the flow of how tenant A was first breached and then how the cloud service 220/cloud partition 228 was breached. This also a breach of the cloud virtualization pattern 900. In addition, because the breach of the tenant partition 224A may be identified in real-time, the breach of the cloud partition 228 can be prevented in real-time. With existing anomaly detection methods, it would be much more difficult to identify how the breach to both the tenant partition 224N and the cloud partition 228 occurred.

While FIG. 9 describes a virtualization pattern where the tenant partition 224N is first breached and then the cloud partition 228, in another embodiment, the cloud partition 228 could be breached first and then one or more individual tenant(s) partition 224. For example, the cloud authentication micro service 226A may be breached by spawning a new malicious micro service that breaches each tenant partition 224. Using this process, the tenant partition 224 breaches may be prevented by initially identifying the cloud partition breach. In addition, other types of breaches may be identified, such as where a first tenant partition 224 is breached and then a second tenant partition 224 is breached (a cross tenant virtualization pattern).

Figure 10:
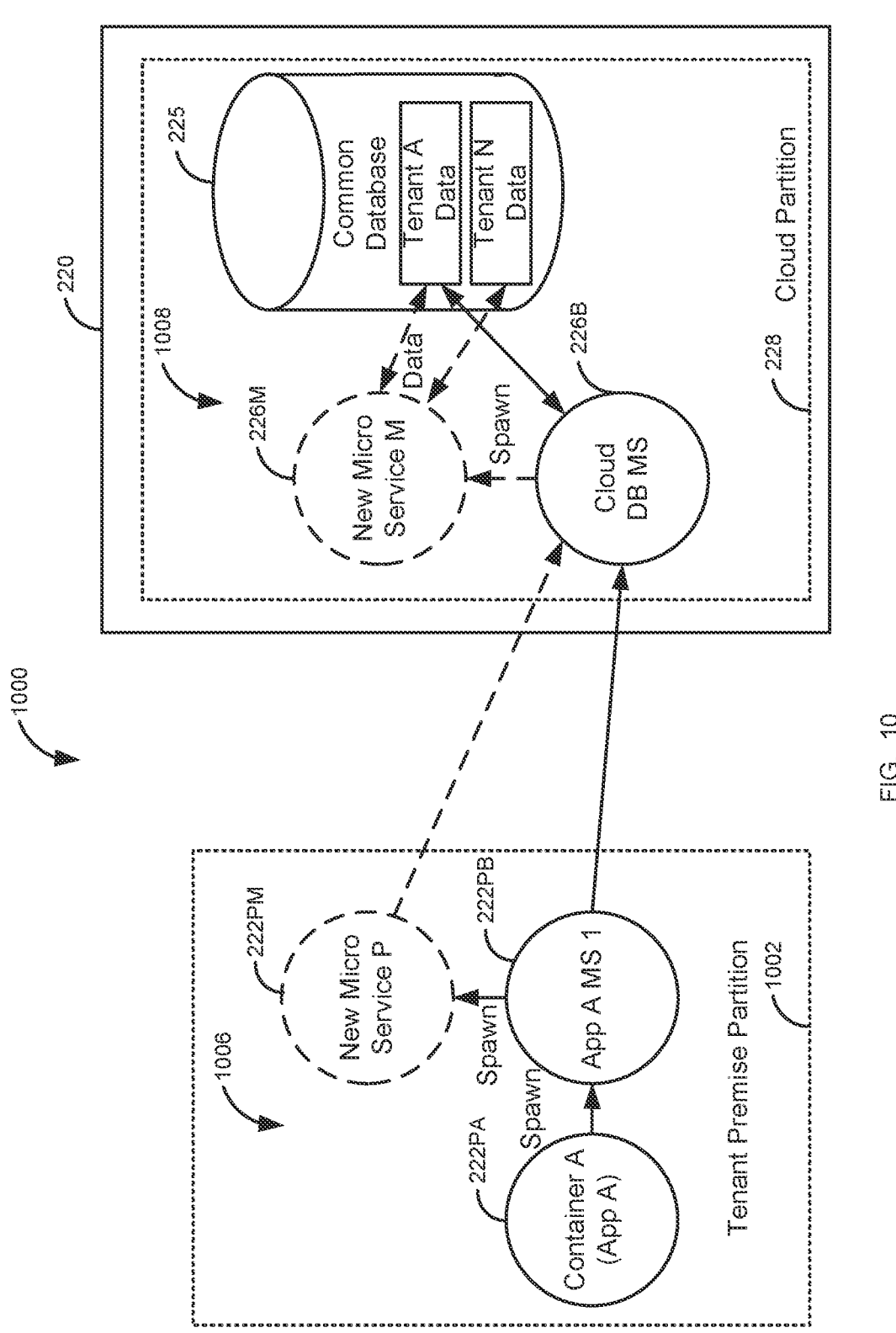
FIG. 10 is a diagram of an anomalous virtualization pattern that shows a progressive breach of a tenant premise partition and a cloud partition.

FIG. 10 is a diagram of an anomalous virtualization pattern 1000 that shows a progressive breach of a tenant premise partition 1002 and a cloud partition 228. In FIG. 10, there are two partitions: 1) a tenant premise partition 1002 (e.g., a partition that is local to the tenant's network 110), and 2) the cloud partition 228. Although not shown, the tenant premise partition 1002 and the cloud partition 228 may be connected by the network 110. In addition, although not shown, there may be multiple tenant premise partitions 1002 for each individual tenant. The tenant premise partition 1002 shows an anomalous tenant premise virtualization pattern 1006 (the anomalies indicated by the dashed lines) and an anomalous cloud virtualization pattern 1008 (the anomalies indicated by the dashed lines). The anomalous premise virtualization pattern 1006 comprises the virtual process 222PA, which spawns the virtual process 222PB. The virtual process 222PB accesses the common virtual process 226B, which in turn accesses the tenant A data in the common database 225.

The anomaly is where the virtual process 222PB spawns the virtual process 222PM, which in turn compromises the common virtual process 226B. The virtual process 226B then spawns the virtual process 226M, which accesses both the tenant A and tenant N data (a tenant premise to cloud breach) in the common database 225.

Alternately, the cloud partition 228 could be breached first and then the tenant premise partition (a cloud to tenant premise breach). In this case, the virtualization pattern would be for a cloud/premise virtualization pattern. The process could extend even further. For example, a premise breach could lead to a cloud breach for a first tenant. The cloud breach for the first tenant could then lead to a breach of another tenant premise partition 1002 or the cloud partition 228. This type of virtualization pattern would be a premise/tenant/cloud virtualization pattern.

The virtualization patterns may include other types of virtual processes 121/122, such as cloning a virtual process 121/222, looking at access privileges between virtual processes 121/222 to look for changes, looking at access times, and/or the like. In addition, the processes described herein can apply to any combination of containers/micro services/ virtual machines.

The virtualization patterns described herein may include other types of associated information, such as, load parameters, virtualized resource usage, (e.g., memory, image being loaded, diskspace, CPU usage, cores allocated for the container/VM), time, dates, threads created, applications loaded in the container/VM, and/or the like. In addition, similar parameters could be used when a container/micro service/ VM is unloaded (e.g., what resources are being used when a virtual process 222 is unloaded). This information could be fed into the machine learning algorithm 125 to identify anomalous behavior in conjunction with the virtualization patterns. This information can then be displayed to a user so that the user can then quickly identify issues. In addition, based on rules, different actions may be automatically taken, such as, locking down a virtual process 222, blocking a port, locking down a cloud virtual process 222, locking down a tenant's virtual processes 222, and/or the like.

In addition, the data may also be used to forecast additional resources that may be used in the future. For example, there may be a trend where the number of containers/VS are going in an upward trend.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that, when executed by the microprocessor, cause the microprocessor to:
monitor temporal flows in a network to provide information describing temporal flows of creating, spawning, using, and/or deleting of a plurality of virtualized resources, the network comprising a plurality of tenants, each tenant being associated with a respective tenant partition, and a cloud service associated with a cloud partition comprising a plurality of virtualized resources, the plurality of virtualized resources being shared by tenant partitions of the plurality of tenants;

based on the information describing temporal flows of creating, spawning, using, and/or deleting of the plurality of virtualized resources, learn tenant and cloud virtualization patterns to provide learned tenant and cloud virtualization patterns, respectively, the learned tenant virtualization patterns describing temporal flows within each tenant partition of the plurality of tenants and the learned cloud virtualization pattern describing temporal flows between the plurality of tenants and the cloud service, the learned tenant and cloud virtualization patterns being different from each other;
compare each of the learned tenant virtualization patterns to a current tenant virtualization pattern and the learned cloud virtualization pattern to a current cloud service virtualization pattern to identify an anomalous virtualization pattern in the current tenant and cloud virtualization patterns; and
in response to identifying the anomalous virtualization pattern, take an action.

2. The system of claim 1, wherein the plurality of resources comprise one or more of a database, disk space, and network resource and the plurality of virtualized resources comprise one or more of a service, micro service, container, and virtual machine, and wherein the information comprises one or more of usage of a virtualized resource, a change in an attribute of the virtualized resource, and a port attribute change associated with the virtualized resource.

3. The system of claim 2, wherein the anomalous virtualization pattern comprises one or more of the plurality of virtualized resources and a malicious virtualized resource monitoring an operation of the one or more of the plurality of virtualized resources, the operation comprising one or more of accessing, interacting with, monitoring information received and/or transmitted by, initiating and/or monitoring a connection with, and/or making a function call to the one or more of the plurality of virtualized resources, and wherein the anomalous virtualization pattern is indicative of a progressive breach of the cloud service comprising one of:
a first breach of a tenant premise partition and a first breach of a cloud partition; and
a second breach of the cloud partition and a second breach of the tenant premise partition.

4. The system of claim 2, wherein the anomalous virtualization pattern comprises one or more of the plurality of virtualized resources and a malicious virtualized resource monitoring an operation of the one or more of the plurality of virtualized resources, the operation comprising one or more of accessing, interacting with, monitoring information received and/or transmitted by, initiating and/or monitoring a connection with, and/or making a function call to the one or more of the plurality of virtualized resources, and wherein the anomalous virtualization pattern is a progressive breach of the cloud service comprising: a first breach of a first tenant partition and a second breach of a second tenant partition.

5. The system of claim 2, wherein the anomalous virtualization pattern comprises one or more of the plurality of virtualized resources and a malicious virtualized resource monitoring an operation of the one or more of the plurality of virtualized resources, the operation comprising one or more of accessing, interacting with, monitoring information received and/or transmitted by, initiating and/or monitoring a connection with, and/or making a function call to the one or more of the plurality of virtualized resources, and wherein identifying the anomalous virtualization pattern comprises tracking how an anomalous virtual process interacts with another virtual process in the cloud service.

6. The system of claim 5, wherein the service is associated with a plurality of different learned virtualization patterns and wherein identifying the anomalous virtualization pattern further comprises tracking anomalous resource usage in another virtual process in the cloud service.

7. The system of claim 5, wherein tracking how the anomalous virtual process interacts with the another virtual process in the cloud service comprises tracking at least one of how the anomalous virtual process: monitors data passed between a plurality of other virtual processes, spawns a new virtual process, and identifies one or more access privileges between the plurality of other virtual processes.

8. The system of claim 1, wherein each of the plurality of tenants is associated with a different learned tenant virtualization pattern, wherein in the comparing the different learned tenant virtualization patterns of the plurality of tenants is compared to the current tenant virtualization pattern of each of the plurality of tenants to identify the anomalous virtualization pattern in the current tenant virtualization pattern, and wherein the cloud service comprises a common cloud virtual process.

9. The system of claim 8, wherein identifying the anomalous virtualization pattern comprises one of:

identifying the anomalous virtualization pattern based on the common cloud virtual process;

identifying the anomalous virtualization pattern based on an individual one of a plurality of tenant partitions;

identifying a first progressive breach of the cloud service comprising: a first breach of the common cloud virtual process and a first breach of the individual one of the plurality of tenant partitions; and identifying a second progressive breach of the cloud service comprising: a second breach of the individual one of the plurality of tenant partitions and a second breach of the common cloud virtual process.

10. The system of claim 1, wherein the information comprises a plurality of a load or unload parameter, a virtualized resource usage, time, date, number of threads created, applications loaded or unloaded in a container and/or virtual machine, wherein the action comprises one or more of: quarantining a virtual process, unloading the virtual process, storing a virtual process image, changing access privileges of the virtual process, quarantining a tenant partition, quarantining a common cloud virtual process, logging out a user, blocking a port on a firewall, blocking access to a common database, and blocking network access for the virtual process.

11. A method comprising:

monitoring temporal flows in a network to provide information describing temporal flows of creating, spawning, using, and/or deleting of a plurality of virtualized resources, the network comprising a plurality of tenants, each tenant being associated with a respective tenant partition, and a cloud service associated with a cloud partition comprising a plurality of resources and the plurality of virtualized resources shared by tenant partitions of the plurality of tenants;

based on the information describing temporal flows of creating, spawning, using, and/or deleting of the plurality of virtualized resources, learning, by a microprocessor, a tenant and cloud virtualization patterns to provide learned tenant and cloud virtualization patterns, respectively, the learned tenant virtualization patterns describing temporal flows within each tenant partition of the plurality of tenants and the learned cloud virtualization pattern describing temporal flows between the plurality of tenants and the cloud service, the learned tenant and cloud virtualization patterns being different from each other;

comparing, by the microprocessor, each of the learned tenant virtualization patterns to a current tenant virtualization pattern and the learned cloud virtualization pattern to a current cloud service virtualization pattern to identify an anomalous virtualization pattern in the current tenant and cloud virtualization patterns; and in response to identifying the anomalous virtualization pattern, selecting, by the microprocessor, an action for implementation.

12. The method of claim 11, wherein the plurality of resources comprise one or more of a database, disk space, and network resource and the plurality of virtualized resources comprise one or more of a service, micro service, container, and virtual machine, and wherein the information describing temporal flows of creating, spawning, using, and/or deleting of the plurality of virtualized resources comprises one or more of usage of a virtualized resource, a change in an attribute of the virtualized resource, and a port attribute change associated with the virtualized resource.

13. The method of claim 12, wherein the anomalous virtualization pattern comprises one or more of the plurality of virtualized resources and a malicious virtualized resource monitoring an operation of the one or more of the plurality of virtualized resources, the operation comprising one or more of accessing, interacting with, monitoring information received and/or transmitted by, initiating and/or monitoring a connection with, and/or making a function call to the one or more of the plurality of virtualized resources, and wherein the anomalous virtualization pattern is indicative of a progressive breach of the cloud service comprising one of:

a first breach of a tenant premise partition and a first breach of a cloud partition; and a second breach of the cloud partition and a second breach of the tenant premise partition.

14. The method of claim 12, wherein the anomalous virtualization pattern comprises one or more of the plurality of virtualized resources and a malicious virtualized resource monitoring an operation of the one or more of the plurality of virtualized resources, the operation comprising one or more of accessing, interacting with, monitoring information received and/or transmitted by, initiating and/or monitoring a connection with, and/or making a function call to the one or more of the plurality of virtualized resources, and wherein the anomalous virtualization pattern is a progressive breach of the cloud service comprising: a first breach of a first tenant partition and a second breach of a second tenant partition.

15. The method of claim 12, wherein the anomalous virtualization pattern comprises one or more of the plurality of virtualized resources and a malicious virtualized resource impacting an operation of the one or more of the plurality of virtualized resources, the operation comprising one or more of accessing, interacting with, monitoring information received and/or transmitted by, initiating and/or monitoring a connection with, and/or making a function call to the one or more of the plurality of virtualized resources, and wherein identifying the anomalous virtualization pattern comprises tracking how an anomalous virtual process interacts with another virtual process in the cloud service.

16. The method of claim 15, wherein the service is associated with a plurality of different learned virtualization patterns and wherein identifying the anomalous virtualization pattern further comprises tracking anomalous resource usage in the another virtual process in the cloud service.

17. The method of claim 15, wherein the information comprises a plurality of a load or unload parameter, a virtualized resource usage, time, date, number of threads created, applications loaded or unloaded in a container and/or virtual machine, and wherein tracking how the anomalous virtual process interacts with the another virtual process in the cloud service comprises tracking at least one of how the anomalous virtual process: monitors data passed between a plurality of other virtual process, spawns a new virtual process, and identifies one or more access privileges between a plurality of other virtual processes.

18. The method of claim 11, wherein each of the plurality of tenants is associated with a different learned virtualization pattern, wherein in the comparing the different learned tenant virtualization patterns of the plurality of tenants is compared to the current tenant virtualization pattern of each of the plurality of tenants to identify the anomalous virtualization pattern in the current tenant virtualization pattern, and the cloud service comprises a common cloud virtual process.

19. The method of claim 18, wherein identifying the anomalous virtualization pattern comprises one of:

identifying the anomalous virtualization pattern based on the common cloud virtual process;

identifying the anomalous virtualization pattern based on an individual one of a plurality of tenant partitions;

identifying a first progressive breach of the cloud service comprising: a first breach of the common cloud virtual process and a first breach of the individual one of the plurality of tenant partitions; and identifying a second progressive breach of the cloud service comprising: a second breach of the individual one of the plurality of tenant partitions and a second breach of the common cloud virtual process.

20. A non-transient computer readable medium having stored thereon instructions that cause a processor to execute a method, the method comprising instructions to:

monitor temporal flows in a network to provide information describing temporal flows of creating, spawning, using, and/or deleting of a plurality of virtualized resources, the network comprising a plurality of tenants, each tenant being associated with a respective tenant partition, and a cloud service associated with a cloud partition comprising a plurality of virtualized resources, the plurality of virtualized resources being shared by tenant partitions of the plurality of tenants;

based on the information describing temporal flows of creating, spawning, using, and/or deleting of the plurality of virtualized resources, learn tenant and cloud virtualization patterns to provide learned tenant and cloud virtualization patterns, respectively, the learned tenant virtualization patterns describing temporal flows within each tenant partition of the plurality of tenants and the learned cloud virtualization pattern describing temporal flows between the plurality of tenants and the cloud service, the learned tenant and cloud virtualization patterns being different from each other;

compare each of the learned tenant virtualization patterns to a current tenant virtualization pattern and the learned cloud virtualization pattern to a current cloud service virtualization pattern to identify an anomalous virtualization pattern in the current tenant and cloud virtualization patterns, wherein the anomalous virtualization pattern comprises one or more of the plurality of virtualized resources and a malicious virtualized resource impacting an operation of the one or more of the plurality of virtualized resources, the operation comprising one or more of accessing, interacting with, monitoring information received and/or transmitted by, initiating and/or monitoring a connection with, and/or making a function call to the one or more of the plurality of virtualized resources; and in response to identifying the anomalous virtualization pattern in the current tenant and cloud virtualization patterns, select an action for implementation.

* * * * *